United States Patent [19]

Somogyi

[11] 4,070,821
[45] Jan. 31, 1978

[54] ELECTRIC WATCH BATTERY CONTACT SPRING

[75] Inventor: Bela Somogyi, Costa Mesa, Calif.

[73] Assignee: Hughes Aircraft Company, Culver City, Calif.

[21] Appl. No.: 669,131

[22] Filed: Mar. 22, 1976

[51] Int. Cl.² ............................ G04C 3/00; H01M 6/50
[52] U.S. Cl. ...................................... 58/23 BA; 429/99
[58] Field of Search .................... 58/23 BA, 50 R, 55; 429/98–100

[56] References Cited

U.S. PATENT DOCUMENTS

| 3,800,525 | 4/1974 | Bergey | 58/50 R |
| 3,866,406 | 2/1975 | Roberts | 58/85.5 |
| 3,992,870 | 11/1976 | Dekel | 58/88 R |

FOREIGN PATENT DOCUMENTS 320,421 3/1957 Switzerland ................ 58/23 BA

Primary Examiner—E. S. Jackmon
Attorney, Agent, or Firm—Allen A. Dicke, Jr.; W. H. MacAllister

[57] ABSTRACT

Electric watch has a single battery contact spring which is centrally located on the watch back to contact both batteries in the watch.

11 Claims, 2 Drawing Figures

ELECTRIC WATCH BATTERY CONTACT SPRING

BACKGROUND

This invention is directed to the structure of an electric watch wherein a single battery contact spring is mounted at the rear of the watch to contact and restrain two watch batteries.

Electric watches often have two batteries therein and in digital watches with modern CMOS electronics, two batteries are necessary to provide reliable operating voltage. In prior watches two battery hatches have been provided in the watch back so that each of the batteries was individually accessible. Such a structure is shown in E. C. Ho, R. J. Belardi and K. H. Reissmueller U.S. Pat No. 3,846,971. It is also seen in R. F. Zurcher and I. B. Merles U.S. Pat. No. 3,838,568.

From these prior patents the complexity of the watch case can be seen. First of all, the watch back can be installed and secured onto the watch case in only one angular orientation so that the hatches are correctly positioned over the batteries. This requirement for positioning prevents employment of a turnable screw-on watch back. Furthermore, two hatch covers and two battery springs are required so that more parts are required and the thickness of the total watch is built up by the watch case structure.

It is necessary to resiliently urge the batteries into their wells so that they make contact with electronics at the upper contact of the batteries away from the watch back. It is also necessary to make electric contact with the lower contact of the battery to complete the series connection so that the series voltage addition of the two batteries is applied to appropriate electronics within the watch. In some cases, such as shown in the above-mentioned prior patents, the intermediate voltage is applied to the watch case and this can be the responsibility of the battery springs.

SUMMARY

In order to aid in the understanding of this invention it can be stated in essentially summary form that it is directed to an electronic watch battery contact spring arrangement wherein a single battery contact spring is mounted on the back of the watch case and is positioned to contact both batteries in the watch.

It is thus an object of this invention to provide a single battery contact spring in an electric watch for contacting with two batteries. It is another object to provide a battery contact spring arrangement centrally located on the back of the case of the electric watch and positioned so that contact is made with two batteries without any orientation of the case back on the watch case. It is a further object of this invention to provide a battery contact spring arrangement which is inexpensive because it employs a single spring and is reliable because this single spring contacts both batteries for reliable electric contact. It is another object to provide a simplified case back assembly with reduced cost by permitting a snap-on case back and with a single contact spring. It is another object to provide an electric watch with improved case styling which does not have the need for individual battery hatches.

Other objects and advantages of this invention will be apparent from a study of the following portion of this specification, the claims, and the attached drawings.

DESCRIPTION OF THE PREFERRED EMBODIMENT

Figure 1:
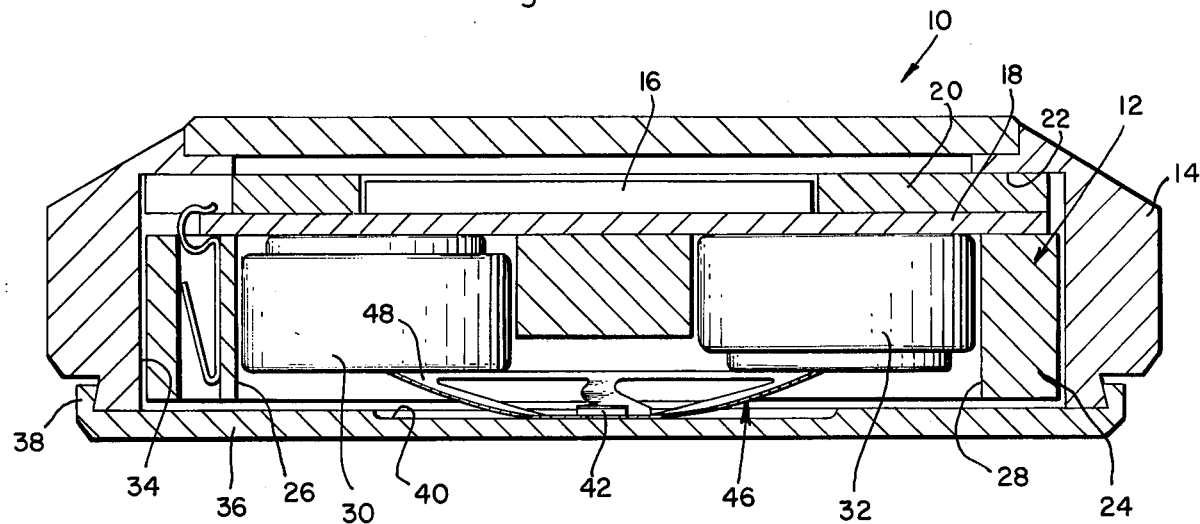
FIG. 1 is a section through an electric watch of the type having a digital time display with the section taken on the watch axis substantially normal to the watch crystal and the watch back and substantially through the center of the watch, and through the two battery wells.

In FIG. 1 an electric watch is illustrated at 10. Watch 10 employs the battery contact spring of this invention. Watch 10 comprises module 12 in case 14. The module is a conventional module such as is found in electric watches, and particularly those which have a digital display of the time information. Such a module is shown in R. A. Burke, R. F. Zurcher, and B. Somogyi U.S. Pat. No. 3,983,689 Another such module is shown in above mentioned Ho et al. U.S. Pat. No. 3,846,971.

Such modules are characterized by a display 16 which is mounted on a substrate 18. An upper spacer 20 engages over the top of substrate 18 and engages under shoulder 22 in the watch case. An opening in upper spacer 20 receives the display and the display controlling electronics conventionally mounted on the top of the substrate. Lower spacer or battery block 24 is positioned under substrate 18. It has battery openings 26 and 28 therein as well as openings to receive other parts mounted below or engaged against substrate 18. Batteries 30 and 32 are positioned in these battery openings and their upper contacts or terminals engage upon electric contact pads on the bottom of substrate 18 which form part of the watch electronics.

Case 14 has a large case interior opening 34 into which the entire assembled module is inserted. Watch back 36 engages the case and closes this opening at the rear side of the case. The engagement can either be by screw threads or snap-on back as illustrated, which may be provided with the necessary gaskets to provide adequate sealing. As is illustrated in FIG. 1, watch back 36 has a peripheral collar 38 which has an inwardly directed inner surface to snap around the outwardly directed outer surface of the watch case. Dimensions are such that secure snap-on and snap-off assembly and disassembly is achieved.

Recess 40 is formed in the center of watch back 36. Stud 42 extends through central opening 44 in battery contact spring 46. Stud 42 is riveted over the battery contact spring with the head of the stud within recess 40 so that no thickness buildup is made on the watch back.

Figure 2:
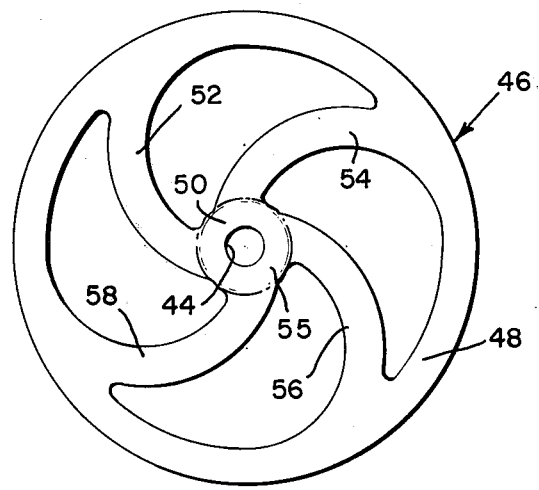
FIG. 2 is a plan view of the battery contact spring of this invention for the electric watch.

Battery contact spring 46 is preferably formed as the partial surface of a sphere. It has continuous circular rim 48 as well as concentric circular hub 50 in which central opening 44 is located. A plurality of spokes 52, 54, 56, and 58 interconnect the hub and rim. The spokes are preferably spiral as indicated in FIG. 2 to permit more freedom of flexure of the spring. Rim 48 lies in a plane when undeflected.

Lateral space conditions in the watch module require that the axes of the batteries 30 and 32 are substantially equidistant from the central axis of the watch. When the center of battery contact spring 46 is centrally located then rim 48 is of such diameter that it touches the lower contacts of the two batteries, preferably substantially at the battery centerlines. Spring 46 is deflected to thrust the batteries into contact on the bottom of the substrate and to thrust the whole module upward in the case. Spring 46 is preferably metallic, such as spring grade beryllium copper and thus also makes a serial electric contact between the two batteries. When fully deflected it can fit within recess 40 so that no thickness is necessary to accommodate the spring.

For this construction the angular orientation of the watch back on the watch case is unimportant to spring engagement with the batteries and therefore a snap-on or screw-on back can be employed. When battery replacement is required, watch back 36 can readily be snapped off the case, the batteries replaced and the back easily reinstalled because there are no loose parts such as battery springs or battery hatches and no particular angular orientation is necessary on reassembly. In this way the case back assembly is simplified and cost is reduced without reduction in reliability or function.

This invention having been described in its preferred embodiment, it is clear that it is susceptible to numerous modifications and embodiments within the ability of those skilled in the art, without exercise of the inventive skill. Accordingly, the scope of this invention is defined by the scope of the following claims.

I claim:
1. An electric watch comprising:
   a case having an open rear, said case having a central axis extending out of said open rear;
   an electric watch module in said open rear of said case, said electric watch module comprising at least first and second batteries exposed to the rear of said module, said batteries being arranged substantially equidistant from said axis;
   a case back engaged on said case and covering said open rear of said case;
   a single spring engaging said case back and the exposed rear of both of said batteries to electrically connect said batteries and to thrust them in a direction into said case, said spring being substantially circular and having its center positioned substantially on said axis, said spring being concave and having an uninterrupted peripheral rim and a central hub, said rim engaging both of said batteries and said hub engaging said watch back.

2. The electric watch of claim 1 wherein said hub of said spring is permanently secured to said watch back.

3. A watch case for an electric watch, said watch case having a case opening in the rear thereof for reception of an electronic watch module;
   a back on said watch case for covering said case opening, said back being mountable on said watch case in a plurality of different angular positions;
   a single dish-shaped battery spring mounted on said back said dish shaped spring having an uninterrupted continuous rim substantially lying in a plane and said plane of said rim being directed toward said case opening for engagement with a plurality of batteries in a watch module in said case opening and said hub being in engagement with said watch back.

4. The watch case of claim 3 wherein said hub is secured to said watch back.

5. The watch case of claim 4 wherein a recess is provided on the inside of said watch back, said recess being sufficient to receive said spring when said rim of said spring is deflected toward said watch back.

6. A spring for an electric watch for contacting the batteries in the electric watch for electrically connecting the batteries and restraining the batteries in the electric watch, said spring having a rim and having a hub and having spokes interconnecting said rim and said hub, said rim lying in a plane, said spring being formed of flat metallic material into a partially spherically shaped dish with said hub lying out of the plane of said rim so that said rim can contact two batteries in the electric watch and said hub can contact the back of the case of the electric watch.

7. The spring of claim 6 wherein said spokes are spirally directed to permit deflection of said hub toward said plane of said rim.

8. The spring of claim 6 wherein said hub is a central opening therein for securement of said spring onto the back of the watch case.

9. A watch case for an electric watch, said watch case having a case opening in the rear thereof for reception of an electric watch module;
   a back on said watch case for covering said case opening, said back being mountable on said watch case in a plurality of different angular positions;
   a single dish-shaped battery spring mounted on said watch back, said spring having a substantially central circular hub and having an uninterrupted continuous rim substantially lying in a plane, said plane of said rim being directed toward said case opening for engagement with a plurality of batteries on a watch module in said case opening and said hub being in engagement with said watch back.

10. The watch case of claim 9 wherein said hub is secured to said watch back.

11. The watch case of claim 10 wherein a recess is provided on the inside of said watch back, said recess being sufficient to receive said spring when said rim of said spring is deflected toward said watch back.

* * * * *